US010921122B2

(12) United States Patent
Leo et al.

(10) Patent No.: US 10,921,122 B2
(45) Date of Patent: Feb. 16, 2021

(54) TILT EVENT DETECTION DEVICE, SYSTEM AND METHOD (71) Applicant: STMICROELECTRONICS S.r.l., Agrate Brianza (IT)

(72) Inventors: Marco Leo, Locate di Triulzi (IT); Paolo Rosingana, Collegno (IT); Marco Castellano, Pavia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 348 days.

(21) Appl. No.: 15/889,891

(22) Filed: Feb. 6, 2018

(65) Prior Publication Data

US 2019/0242704 A1    Aug. 8, 2019

(51) Int. Cl.
*G01C 9/06* (2006.01)
*G01P 15/18* (2013.01)
*G06F 13/24* (2006.01)

(52) U.S. Cl.
CPC .............. *G01C 9/06* (2013.01); *G01P 15/18* (2013.01); *G06F 13/24* (2013.01)

(58) Field of Classification Search
CPC ............ G01C 9/06; G06F 13/24; G01P 15/18
See application file for complete search history.

(56) References Cited

U.S. PATENT DOCUMENTS

| | | | | |
|---|---|---|---|---|
| 2008/0071851 A1* | 3/2008 | Zohar | ................... | G06F 7/5443 708/626 |
| 2009/0262868 A1* | 10/2009 | Mohammed | ...... | H04L 25/03006 375/340 |
| 2012/0136573 A1* | 5/2012 | Janardhanan | ........ | G01C 21/165 701/512 |
| 2015/0309098 A1* | 10/2015 | van der Cammen | .. | G01R 27/02 324/650 |
| 2017/0299388 A9* | 10/2017 | Karahan | ............ | G01C 19/5776 |
| 2017/0315780 A1* | 11/2017 | Zhong | ..................... | G06F 7/483 |

OTHER PUBLICATIONS

"IEEE Standard for Floating-Point Arithmetic," IEEE Std 754™—2008, IEEE Computer Society, Aug. 29, 2008, 70 pages.
"Tilt detector," Android Open Source Project, last updated Mar. 27, 2017, retrieved from https://source.android.com/devices/sensors/sensor-types#tilt_detector on Feb. 13, 2018, 2 pages.

* cited by examiner

*Primary Examiner* — Mohamed Charioui
(74) *Attorney, Agent, or Firm* — Seed IP Law Group LLP (57) ABSTRACT

A sensor includes an accelerometer, which, in operation, generates accelerometer data, and digital signal processing circuitry. The digital signal processing circuitry, in operation, generates, based on the generated accelerometer data, a value indicative of a cosine of an angle between an acceleration vector associated with current accelerometer data and a reference acceleration vector, compares the generated value indicative of the cosine of the angle between the vector associated with current accelerometer data and the reference acceleration vector with one or more thresholds and generates a tilt signal based on the comparison of the generated value indicative of the cosine of the angle between the vector associated with current accelerometer data and the reference acceleration vector with the one or more thresholds. The tilt signal may be used as an interrupt signal to an application processor.

31 Claims, 4 Drawing Sheets

TILT EVENT DETECTION DEVICE, SYSTEM AND METHOD

BACKGROUND

Technical Field

The present disclosure generally relates to electronic devices and, more specifically, to electronic devices having accelerometers.

Description of the Related Art

Electronic devices, such as mobile phones, tables, laptops, etc., may perform calculations using the application processor of the device to determine tilt angles using various algorithms. The calculated tilt angles may be used, for example, to detect movements so that appropriate action may be taken in response (e.g., initiating further processing of motion data (e.g., to determine a movement associated with the tilt event), suspending one or more processes, etc.). Input signals from one or more sensors (e.g., accelerometers, microelectromechanical systems (MEMS) etc.) are provided to the application processor or processing core of the device for use in determining the tilt angle.

BRIEF SUMMARY

In an embodiment, a device comprises: an accelerometer, which, in operation, generates accelerometer data; and digital signal processing circuitry communicatively coupled to the accelerometer, wherein the digital signal processing circuitry, in operation: generates, based on the generated accelerometer data, a value indicative of a cosine of an angle between an acceleration vector associated with current accelerometer data and a reference acceleration vector; compares the generated value indicative of the cosine of the angle between the acceleration vector associated with current accelerometer data and the reference acceleration vector with one or more thresholds; and generates a tilt signal based on the comparison of the generated value indicative of the cosine of the angle between the acceleration vector associated with current accelerometer data and the reference acceleration vector with the one or more thresholds. In an embodiment, the accelerometer is a three-axis accelerometer which, in operation, outputs an acceleration signal of each axis. In an embodiment, the accelerometer comprises an analog-to-digital converter. In an embodiment, the digital signal processing circuitry comprises a low pass filter, which in operation, generates, for each axis, a filtered acceleration signal. In an embodiment, the filtered acceleration signals are moving averages of the acceleration signal of the respective axis over a finite sliding window. In an embodiment, the digital signal processing circuitry includes a vector magnitude detector circuit, which, in operation, determines magnitudes of vectors associated with current accelerometer data. In an embodiment, the digital signal processing circuitry includes a scalar product circuit, which, in operation, generates a value indicative of a scalar product of the vector associated with current accelerometer data and the reference acceleration vector. In an embodiment, the digital signal processing circuitry comprises a division circuit, which, in operation, divides a numerator by a denominator, generating the value indicative of the cosine of the angle between the acceleration vector associated with current accelerometer data and the reference acceleration vector, wherein the numerator is the value indicative of the scalar product, and the denominator is a value indicative of a magnitude of the vector associated with current accelerometer data multiplied by a value indicative of a magnitude of the reference acceleration vector. In an embodiment, the division circuit, in operation, generates an inverse of the denominator. In an embodiment, the reference acceleration vector is a vector associated with previous accelerometer data. In an embodiment, the digital signal processing circuitry, in operation, compares the generated value indicative of the cosine of the angle between the acceleration vector associated with current accelerometer data and the reference acceleration vector to a threshold value; and in response to the comparison indicating the generated value indicative of the cosine of the angle between the acceleration vector associated with current accelerometer data and the reference acceleration vector exceeds the threshold value, sets the tilt signal to indicate detection of a tilt. In an embodiment, the tilt signal is an interrupt signal. In an embodiment, the digital signal processing circuitry comprises one or more of: one or more coordinate rotation digital computer (CORDIC) circuits; one or more floating point circuits; one or more fixed point circuits; one or more adders; one or more multipliers; one or more look-up-tables; and one or more comparators.

In an embodiment, a system comprises: one or more processing cores, which in operation, process digital data; and a sensor, communicatively coupled to the one or more processing cores, the sensor including: an accelerometer, which, in operation, generates accelerometer data; and digital signal processing circuitry communicatively coupled to the accelerometer, wherein the digital signal processing circuitry, in operation: generates, based on the generated accelerometer data, a value indicative of a cosine of an angle between an acceleration vector associated with current accelerometer data and a reference acceleration vector; compares the generated value indicative of the cosine of the angle between the acceleration vector associated with current accelerometer data and the reference acceleration vector with one or more thresholds; and generates a tilt signal based on the comparison of the generated value indicative of the cosine of the angle between the acceleration vector associated with current accelerometer data and the reference acceleration vector with the one or more thresholds. In an embodiment, the accelerometer is a three-axis accelerometer which, in operation, outputs an acceleration signal of each axis. In an embodiment, the digital signal processing circuitry comprises a low pass filter, which in operation, generates, for each axis, a filtered acceleration signal. In an embodiment, the digital signal processing circuitry includes a vector magnitude detector circuit, which, in operation, determines magnitudes of vectors associated with current accelerometer data. In an embodiment, the digital signal processing circuitry includes a scalar product circuit, which, in operation, generates a value indicative of a scalar product of the vector associated with current accelerometer data and the reference acceleration vector. In an embodiment, the digital signal processing circuitry comprises a division circuit, which, in operation, divides a numerator by a denominator, generating the value indicative of the cosine of the angle between the acceleration vector associated with current accelerometer data and the reference acceleration vector, wherein, the numerator is the value indicative of the scalar product, and the denominator is a value indicative of a magnitude of the vector associated with current accelerometer data multiplied by a value indicative of a magnitude of the reference acceleration vector. In an embodiment, the reference acceleration vector is a vector associated with previous accelerometer data. In an embodiment, the tilt signal is an interrupt signal and the one or more processing cores, in operation, responds to the interrupt signal by analyzing accelerometer data generated by the accelerometer.

In an embodiment, a method comprises: generating, using digital signal processing circuitry, a value indicative of a cosine of an angle between an acceleration vector associated with current accelerometer data and a reference acceleration vector; comparing the generated value indicative of the cosine of the angle between the acceleration vector associated with current accelerometer data and the reference acceleration vector with one or more thresholds; and generating a tilt signal based on the comparison of the generated value indicative of the cosine of the angle between the vector associated with current accelerometer data and the reference acceleration vector with the one or more thresholds. In an embodiment, the method comprises generating accelerometer data using a three-axis accelerometer. In an embodiment, the method comprises: filtering the generated accelerometer data, generating the current accelerometer data. In an embodiment, the generating the value indicative of the cosine of the angle between the acceleration vector associated with current accelerometer data and the reference acceleration vector comprises: determining a magnitude of the acceleration vector associated with the current accelerometer data; determining a scalar product of the acceleration vector associated with the current accelerometer data and the reference acceleration vector; and dividing a numerator by a denominator, wherein, the numerator is the determined scalar product, and the denominator is the magnitude of the acceleration vector associated with current accelerometer data multiplied by the magnitude of the reference acceleration vector. In an embodiment, the method comprises: generating an application-processor interrupt signal based on the tilt signal.

DETAILED DESCRIPTION

In the following description, certain details are set forth in order to provide a thorough understanding of various embodiments of devices, systems, methods and articles. However, one of skill in the art will understand that other embodiments may be practiced without these details. In other instances, well-known structures and methods associated with, for example, circuits, such as transistors, multipliers, adders, dividers, comparators, transistors, integrated circuits, logic gates, finite state machines, accelerometers, gyroscopes, magnetic field sensors, memories, bus systems, etc., have not been shown or described in detail in some figures to avoid unnecessarily obscuring descriptions of the embodiments.

Unless the context requires otherwise, throughout the specification and claims which follow, the word "comprise" and variations thereof, such as "comprising," and "comprises," are to be construed in an open, inclusive sense, that is, as "including, but not limited to."

Reference throughout this specification to "one embodiment," or "an embodiment" means that a particular feature, structure or characteristic described in connection with the embodiment is included in at least one embodiment. Thus, the appearances of the phrases "in one embodiment," or "in an embodiment" in various places throughout this specification are not necessarily referring to the same embodiment, or to all embodiments. Furthermore, the particular features, structures, or characteristics may be combined in any suitable manner in one or more embodiments to obtain further embodiments.

The headings are provided for convenience only, and do not interpret the scope or meaning of this disclosure.

The sizes and relative positions of elements in the drawings are not necessarily drawn to scale. For example, the shapes of various elements and angles are not drawn to scale, and some of these elements are enlarged and positioned to improve drawing legibility. Further, the particular shapes of the elements as drawn are not necessarily intended to convey any information regarding the actual shape of particular elements, and have been selected solely for ease of recognition in the drawings.

Conventionally, a processing core of an electronic device receives data from sensors and determines a tilt angle of the device based on the received data using a software algorithm. The tilt angle may be used to detect, for example, when a person stands up from a chair or similar movements. Using the processing core of a device to determine the tilt angle for use by an application uses a lot of power, as the data generated by the sensors is analyzed by the processor core to determine whether an event, such as a movement, has occurred.

The inventors have realized that a tilt event can be detected based on a cosine of the angle, and further that this approach can be implemented in hardware (such as filters, adders, multipliers, finite state machines, etc.) of a device, which may be included in a sensor, such as an accelerometer, instead of by the processing core of the device monitoring all the data and determining tilt angles. Once a tilt event is detected by the hardware, such as hardware in a sensor, an interrupt may be generated by the hardware, and the processing core of the device can then process data related to the tilt event (e.g., to determine the tilt angle, to classify a movement, to initiate action in response to detection of the movement, etc). Both using the cosine of the angle instead of the angle and using hardware instead of the processing core facilitates reducing the power consumption and processor bandwidth associated with tilt events.

Figure 1:
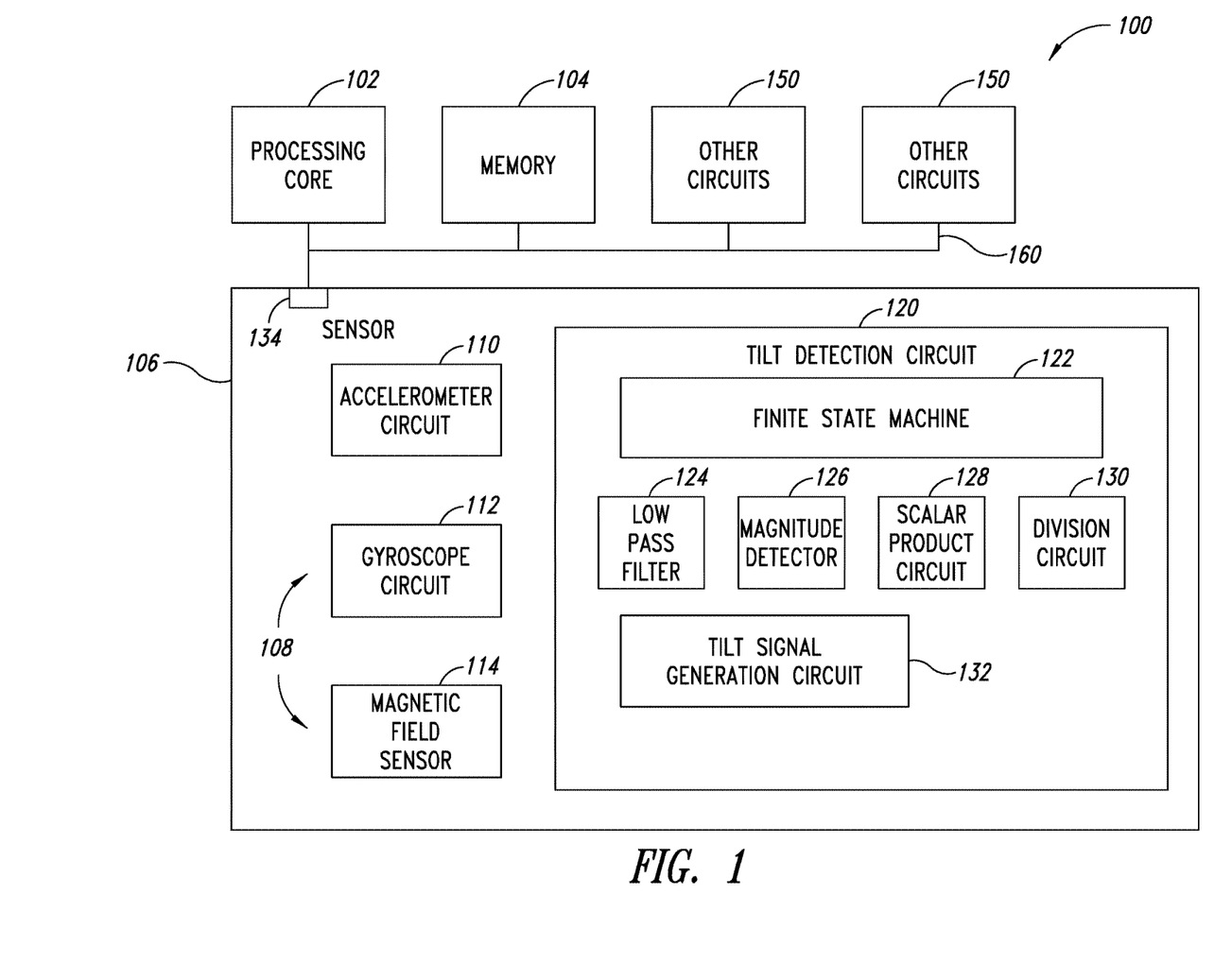
FIG. 1 is a functional block diagram of an embodiment of an electronic device or system.

FIG. 1 is a functional block diagram of an embodiment of an electronic device or system 100 of the type to which the embodiments which will be described may apply. The system 100 comprises one or more processing cores or circuits 102. The processing core 102 may comprise, for example, one or more processors, a state machine, a microprocessor, a programmable logic circuit, discrete circuitry, logic gates, registers, etc., and various combinations thereof. The processing core may control overall operation of the system 100, execution of application programs by the system 100, etc. The system 100 includes one or more memories 104, such as one or more volatile and/or non-volatile memories which may store, for example, all or part of instructions and data related to applications and operations performed by the system 100. As illustrated, the system 100 includes one or more other circuits 150, which may include interfaces, transceivers, antennas, power supplies, etc., and a bus system 160, which may include one or more data, address, power and/or control buses coupled to the various components of the system 100.

The system 100 also includes one or more sensors 106, which include one or more sensing circuits 108 to sense conditions of device with respect to an environment of the sensors, such as one or more accelerometers 110, one or more gyroscopes 112, one or more magnetic field sensors 114, etc. The sensing circuits 108 may be implemented using MEMS or other technology. The sensor 106 includes a tilt detection circuit 120, which as illustrated includes a finite state machine or circuit 122, one or more filters 124, such as a low pass filter, which may be a digital filter, one or more magnitude detection circuits 126, one or more scalar product circuits 128, one or more dividers or division circuits 130, and a tilt signal generation circuit 132. The sensor 106 may also include various other components, such as an internal bus system (not shown), one or more interfaces 134, power circuitry (not shown), etc.

In some embodiments, the system 100 may include more components than illustrated, may include fewer components than illustrated, may split illustrated components into separate components, may combine illustrated components, etc., and various combinations thereof. For example, the sensor 106 may omit the gyroscope 112 and the magnetic field sensor 114 in some embodiments, may combine the tilt signal generation circuit 132 with the FSM 122 in some embodiments, in some embodiments, the sensor 106 and the tilt detection circuit 120 may be separate components coupled together by the bus system 160, etc.

Figure 2:
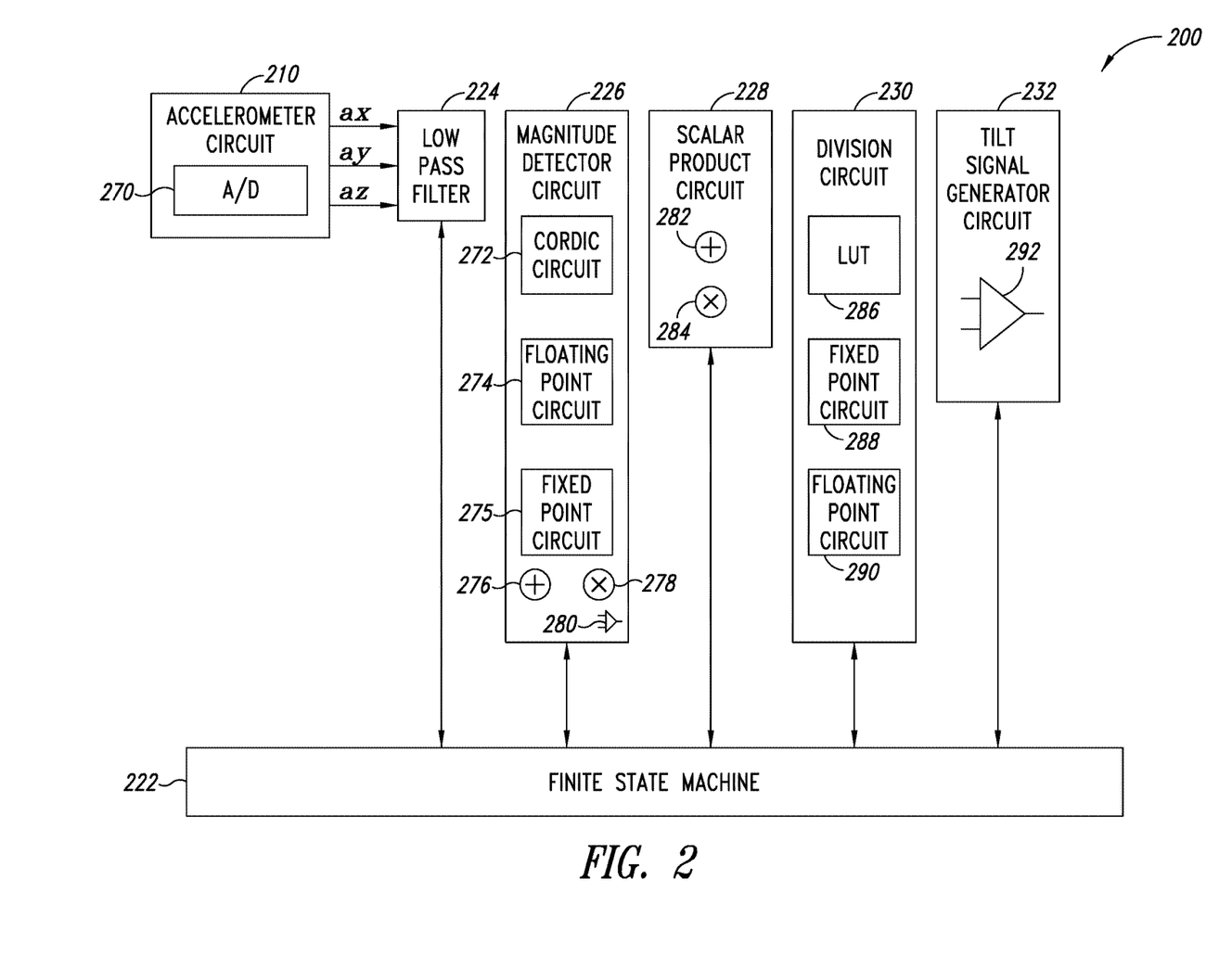
FIG. 2 is a functional block diagram of an embodiment of a sensor circuit.

FIG. 2 illustrates an embodiment of a sensor circuit 200, which may be employed, for example, in the system 100 of FIG. 1. The sensor circuit 200 includes an accelerometer circuit 210, which, in operation, generates one or more signals indicative of an acceleration with respect to one or more axis of movement. The accelerometer 210 as illustrated is a three-axis accelerometer, which may be, for example, equipped with an internal analog-to-digital converter 270 operating at a sampling rate $f_s$, e.g., 100 Hz, which provides three accelerometer signals in output namely ax, ay, az, according to axis x, y and z respectively.

The sensor circuit 200 includes a finite state machine (FSM) or control circuit 222, which, in operation, controls the timing of data and control signals provided to and received from other components of the sensor circuit 200, and resets or initializes the data in the event a reset signal is received or a tilt event is detected.

The sensor circuit 200 includes a low-pass filter 224, which, in operation, receives the accelerometer signals ax, ay, az, from the accelerometer 210 and generates filtered output signals xf, yf, zf, which in an embodiment are output to or under the control of the FSM 222. In an embodiment, a fixed point, first order infinite impulse response (IIR) filter may be employed as the low-pass filter. In an embodiment, an exponential moving average IIR filter may be employed as the low pass filter 224. In an embodiment, a moving average finite impulse response (FIR) filter may be employed as the low-pass filter 224.

The outputs xf, yf, zf, of the low-pass filter may correspond to slow-motion components or moving averages, such as exponential moving averages, of the corresponding accelerometer signals over a finite sliding window. The low-pass filter 224 may include one or more registers, which, in operation, store the cut-off frequency and/or filter coefficients. Adjusting the cut-off frequency and/or filter coefficients adjusts the duration of the sliding window. In an embodiment, higher order filters may be employed. In an embodiment, a floating point filter may be employed. The duration of the sliding window may correspond, for example, to a time period of two seconds.

In an embodiment, the low-pass filter 224 receives control signals (e.g., coefficients, cut-off frequencies, reset signals, etc.) from the FSM 222, and provides the filtered output signals xf, yf, zf, to the FSM 222 or under the control of the FSM 222.

The sensor circuit 200 includes a magnitude detector or magnitude determining circuit 226. The magnitude detector 226, in operation, determines magnitudes of vectors Vxyz corresponding to the filtered accelerometer signals xf, yf, zf. In operation, the magnitude detector 226 receives accelerometer signals from or under the control of the FSM 222, and generates a corresponding magnitude V associated with the vector Vxyz. The magnitude V is output to or under the control of the FSM 222. In an embodiment, the magnitude detector 226 may comprise a coordinate rotation digital computer (CORDIC) circuit 272, which, in operation, may determine a magnitude of a vector based on two accelerometer values (e.g., Vxy based on xf and yf), and then determines a magnitude of a vector based on the result and on the third accelerometric value (e.g., V based on Vxy and zf). In an embodiment, the magnitude detector 226 may comprise a floating point arithmetic circuit (FPU) 274. The FPU may be, for example, a 16-bit Half Precision FPU (see IEEE 754-2008), a custom FPU based on the IEEE 754-2008 standard, a mid-precision FPU (e.g., a 24 bit representation with 1 bit for the sign, 6 bits for the exponent, and 17 bits for the mantissa, see FIG. 4), etc. A fixed point arithmetic circuit 275 may be employed in the magnitude detector 226 in an embodiment. Other mathematical processing circuits may be employed.

In an embodiment, absolute values and approximation may be employed by the magnitude detector 226. For example, with xf, yf and zf having 8 bit representations, the absolute value of the magnitude |V| may be estimated according to:

$$\text{rin} = \text{abs}(xf) + \text{abs}(yf) + \text{abs}(zf) \qquad (1)$$

$$\text{sin} = \max(\text{abs}(xf), \text{abs}(yf)) \qquad (2)$$

$$\text{sin}' = \max(\text{sin}, \text{abs}(z)) \qquad (3)$$

$$|V| = (\text{rin} \cdot (45) + \text{sin}' \cdot (77))/128 \qquad (4)$$

where abs is an absolute value function, max is a maximum function, and 45, 77 and 128 are coefficients or parameters which can be adjusted based on the bit length. Thus, the magnitude detector 226 can be implemented in an embodiment using multiplications, additions and magnitude comparisons. In an embodiment, the magnitude detector comprises an adder circuit 276, a multiplier circuit 278 and a comparator circuit 280, which, in operation, perform additions, multiplications and magnitude comparisons to estimate vector magnitudes.

In an embodiment, the magnitude detector 226 receives control signals (e.g., clock signals, reset signals, etc.) from the FSM 222, receives data signals (e.g., xf, yf, xf) from the FSM 222 or from the low-pass filter 224, possibly under the control of the FSM 222, and outputs vector magnitude values (e.g., V1, V2, |V1|, |V2|), to the FSM 222 or under the control of the FSM 222.

The sensor 200 also comprises a scalar product circuit 228, which in operation determines a scalar product of a reference acceleration vector, such as an initial or previous vector V1 (e.g., a vector V1 having coordinates or modules x1, y1 and z1), and a current acceleration vector V2 (e.g., a vector V2 having coordinates or modules x2, y2 and z2). Acceleration vector V1 may correspond to a default vector, a starting vector or an acceleration vector of a last detected tilt event. Acceleration vector V2 corresponds to a current acceleration vector. The scalar product circuit 228 as illustrated comprises a multiplier circuit 282, and an adder circuit 284. The scalar product B may be represented as follows:

$$B = x1 \cdot x2 + y1 \cdot y2 + z1 \cdot z2 \quad (5)$$

Thus, the scalar product circuit 228 in operation may generate a value of the scalar product B by using the multiplier circuit 282 and the adder circuit 284 according to equation 5. The scalar product generator 228 may output the scalar product B to the FSM 222 or under the control of the FSM 222. In an embodiment, the scalar product B may be computed serially using the multiplier 282 and the adder 284 as follows:

$$\text{Variable1} = x1 \cdot x2 \quad (6)$$

$$\text{Variable2} = y1 \cdot y2 \quad (7)$$

$$\text{Variable3} = z1 \cdot z2 \quad (8)$$

$$\text{Variable4} = (\text{Variable1}) + (\text{Variable2}) \quad (9)$$

$$B = (\text{Variable3}) + (\text{Variable4}) \quad (10)$$

In an embodiment, the scalar product circuit 228 receives control signals (e.g., clock signals, etc.) from the FSM 222, receives data signals (e.g., xf, yf, xf) from the FSM 222 or from the low-pass filter 224, possibly under the control of the FSM 222, and outputs the scalar product B to the FSM 222 or under the control of the FSM 222.

The scalar product also can be represented as follows:

$$B = (V1)(V2)(\cos(\alpha)) \quad (11)$$

where $\alpha$ is the angle between the vectors V1 and V2. Combining equations 5 and 11, the following equation is obtained:

$$\cos(\alpha) = (x1 \cdot x2 + y1 \cdot y2 + z1 \cdot z2)/((V1)(V2)) \quad (12)$$

In an embodiment, only absolute values are considered, thus obtaining the following equation:

$$|\cos(\alpha)| = |(x1 \cdot x2 + y1 \cdot y2 + z1 \cdot z2)|/(|V1||V2|) \quad (13)$$

The numerators in equations 12 and 13 may be determined using only additions and subtractions (e.g., B or |B| by the scalar product circuit 228). The denominators in equations 12 and 13 may be determined by multiplication followed by inversion.

The sensor 200 includes a division circuit 230, which in operation, determines a value indicative of $\cos(\alpha)$ based on equation 12, or in an embodiment, a value indicative of $|\cos(\alpha)|$ based on equation 13. In an embodiment, the division may be implemented using a look-up-table (LUT) 286. In an embodiment, the division may be implemented by computing the inverse of the denominator (e.g., using a Newton-Raphson approximation algorithm, etc.) and multiplying the numerator by the inverse. In an embodiment, a fixed point circuit 288 may be employed to perform the division. In an embodiment, a floating point circuit (FPU) 290 may be employed to perform the division. The FPU may be, for example, a 16-bit Half Precision FPU (see IEEE 754-2008), a custom FPU based on the IEEE 754-2008 standard, a mid-precision FPU (e.g., a 24 bit representation with 1 bit for the sign, 6 bits for the exponent, and 17 bits for the mantissa, see FIG. 4), etc.

The QUAKE III™ algorithm by J. Carmak may be used for a 32 bit IEEE floating point unit to determine an approximate inverse square root of the denominator using two rounds of a Newton approximation. Then an approximate reciprocal of the denominator may be determined by squaring the inverse square root. The QUAKE III™ algorithm uses an initial guess of 0x5f3759df for a 32-bit float. For a 24-bit float (e.g., a 24 bit representation with 1 bit for the sign, 6 bits for the exponent, and 17 bits for the mantissa, see FIG. 4), the initial guess may be modified to 0x5CDD67. For a 16-bit float (10 mantissa, 5 exponent, 1 sign), the initial guess may be modified to 0x59BA.

In an embodiment, the division circuit 230 receives control signals (e.g., clock signals, etc.) from the FSM 222, receives data signals (e.g., one or more of V1, V2, |V1|, |V2|, B, |B|) from the FSM 222 or from the magnitude detector circuit 226 and the scalar product circuit 228, possibly under the control of the FSM 222, and outputs a value indicative of $\cos(\alpha)$ or $|\cos(\alpha)|$ to the FSM 222 or under the control of the FSM 222.

In an embodiment, the value indicative of $\cos(\alpha)$ may be compared to one or more threshold ranges (e.g., the range of values between the cosine of 25 degrees and the cosine of minus 25 degrees, the range of values between the cosine of 35 degrees and the cosine of minus 35 degrees, etc.), to determine whether a tilt event has occurred. When the value indicative of $\cos(\alpha)$ is outside the range, it may be determined that a tilt event has occurred. In an embodiment, the value indicative of $|\cos(\alpha)|$ may be compared to one or more threshold values (e.g., a value corresponding to a cosine of 25 degrees, a value corresponding to a cosine of 35 degrees, etc.), to determine whether a tilt event has occurred. When the value indicative of $|\cos(\alpha)|$ exceeds the threshold, it may be determined that a tilt event has occurred. Other threshold ranges and thresholds may be employed. It is not necessary to determine the angle $\alpha$ to determine whether a tilt event has occurred. In an embodiment, determining a value indicative of $\cos(a)$ (e.g., $\cos(a)$, $|\cos(\alpha)|$, or an approximation or estimation of $\cos(\alpha)$ or $|\cos(\alpha)|$) instead of determining the angle $\alpha$ facilitates simplifying the detection process and reducing power usage.

The sensor 200 includes a tilt signal generation circuit 232, which in operation, compares a value indicative of the cosine of an angle between two acceleration vectors (e.g., $\cos(\alpha)$ or $|\cos(\alpha)|$ or an approximation or estimation thereof generated by the division circuit 230) to one or more threshold ranges (e.g., the range of values between the cosine of 25 degrees and the cosine of minus 25 degrees, the range between cosine of 35 degrees and the cosine of minus 35 degrees, etc.), or to one or more threshold values (e.g., a value corresponding to a cosine of 25 degrees, a value corresponding to a cosine of 35 degrees, etc.), to determine whether a tilt event has occurred. When the value indicative of the cosine of an angle is outside the range or greater than the threshold, it may be determined that a tilt event has occurred. Other threshold ranges and threshold values may be employed. The tilt signal generator circuit may comprise, for example, one or more digital comparators 292.

In an embodiment, the tilt signal generator circuit 232 receives control signals (e.g., clock signals, threshold values and ranges, etc.) from the FSM 222, receives data signals (e.g., the value indicative of $\cos(\alpha)$ or $|\cos(\alpha)|$ from the FSM 222 or from the division circuit 230, possibly under the control of the FSM 222) and generates a signal TILT indicative of detection of a tilt event. The TILT signal alone or together with the acceleration data signals and other data signals (e.g., one or more of ax, ay, az, xf, yf, zf, V1, V2, V1, V2, historical acceleration data signals, other sensor data, etc.) may be provided to an application processor (see processing core 102 of FIG. 1), so that further processing may occur. For example, an application may respond to receipt of a TILT signal by analyzing sensor data to classify a movement associated with the tilt event, such as a standing movement, a sitting movement, etc., and take appropriate action in response thereto.

In some embodiments, the sensor 200 may include more components than illustrated, may include fewer components than illustrated, may split illustrated components into separate components, may combine illustrated components, etc., and various combinations thereof. For example, the low pass filter 224, the magnitude detector circuit 226, the scalar product circuit 228, the division circuit 230, the tilt signal generator circuit 232 and the finite state machine 223 may be in a tilt detection circuit separate from the sensor 200 in an embodiment. In another example, one or more of the low pass filter 224, the magnitude detector circuit 226, the scalar product circuit 228, the division circuit 230 and the tilt signal generator circuit may be integrated into the finite state machine 223 in an embodiment. In some embodiments, the various circuits of the sensor 200 may share one or more calculation circuits, such as a fixed point circuit or a floating point circuit.

Figure 3:
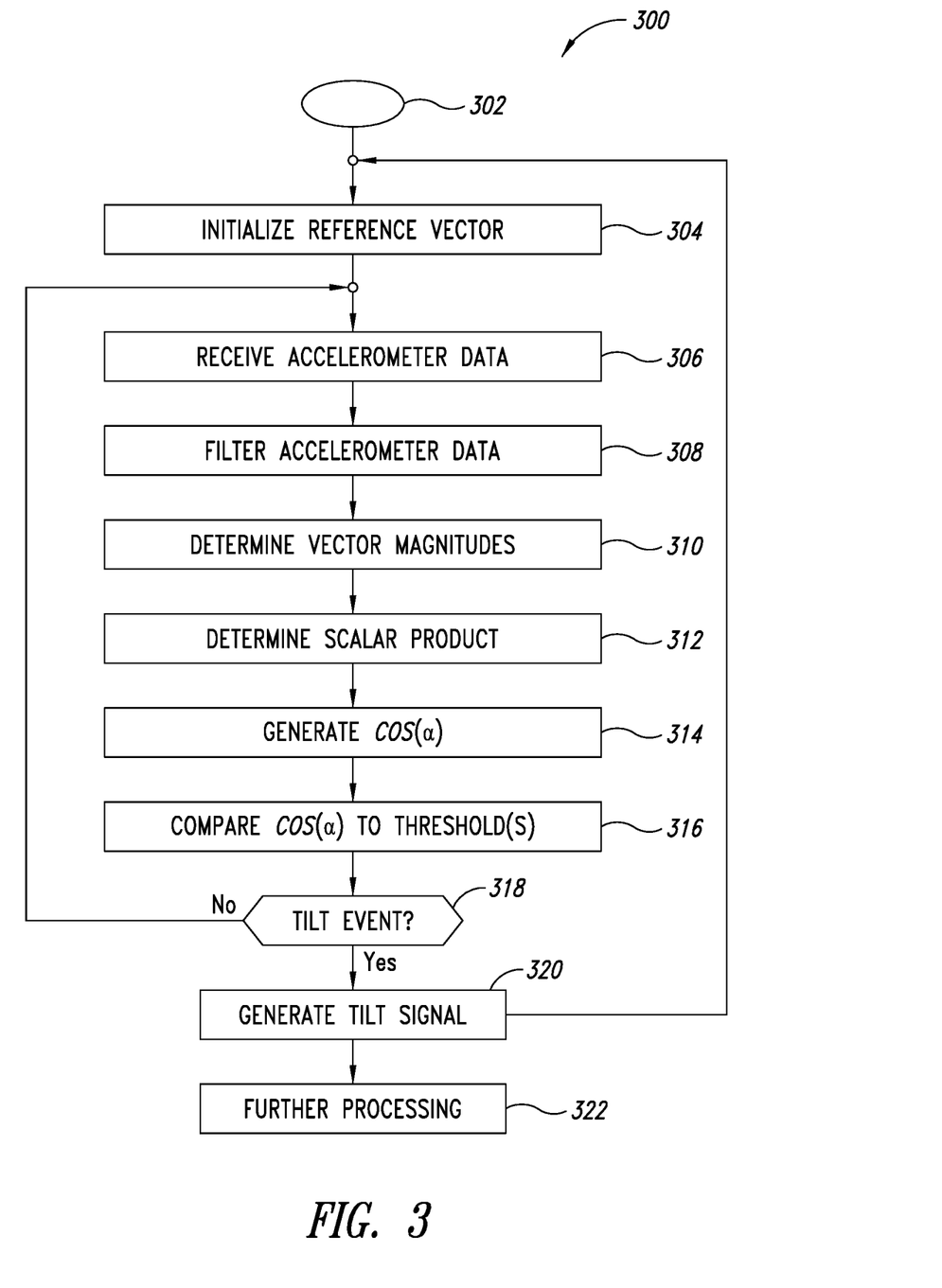
FIG. 3 illustrates an embodiment of a method of detecting a tilt event.

FIG. 3 illustrates an embodiment of a method 300 of detecting a tilt event, and for convenience will be described with respect to the embodiment of the system 100 of FIG. 1 and the embodiment of the sensor 200 of FIG. 2. Other systems and sensors may be employed to perform embodiments of the method 300 of FIG. 3.

The method 300 starts at 302. The method 300 may be initiated by an application executing on an application processor (see processing core 102 of FIG. 1). For example, an exercise program executing on an application processor and which uses accelerometer data may initiate execution of the method 300. In another example, the method 300 may be initiated when a sensor (such as the sensor 106 of FIG. 1 or the sensor 200 of FIG. 2) is powered on. The method 300 proceeds from 302 to 304.

At 304, the method 300 initializes a reference acceleration vector. For example, the FSM 122 of FIG. 1 or the FSM 222 of FIG. 2 may initialize the reference acceleration vector to a default value (e.g., (0,0,0) at startup), to a start-up value (e.g., to the most recent values (xf, yf, zf)), or to the vector associated with the last detection of a trigger event. For example, when a tilt event is detected at act 318, the reference vector may be initialized to the vector V2 which triggered the tilt event. The method proceeds from 304 to 306.

At 306, the method 300 receives or samples accelerometer data. For example, the accelerometer circuit 110 of FIG. 1 may provide accelerometer data ax, ay, az to the tilt detection circuit 120 of FIG. 1, or the accelerometer circuit 210 of FIG. 2 may provide accelerometer data ax, ay, az to the low pass filter 224 of FIG. 2. The method 300 proceeds from 306 to 308.

At 308, the method 300 filters the accelerometer data. This may be done, for example, using a low-pass filter, such as the low-pass filter 124 of FIG. 1 or the low-pass filter 224 of FIG. 2, to produce filtered accelerometer data xf, yf, zf. The filtered accelerometer data may correspond to slow-motion components, a moving average of the accelerometer data, etc. The method 300 proceeds from 308 to 310.

At 310, the method 300 determines or retrieves vector magnitudes V1, V2 of the reference acceleration vector V1 (which may be represented as (xf1, yf1, zf1)) and of a current acceleration vector V2 (e.g., (xf, yf, zf), which may be represented as (xf2, yf2, zf2)). The magnitude V1 of the reference acceleration vector V1 may have already been determined, and thus may be retrieved instead of being recalculated. The magnitudes V1 and V2 may be determined, for example, using the magnitude determining circuit 226 of FIG. 2, as discussed above. The method 300 proceeds from 310 to 312.

At 312, the method 300 determines the scalar product B of the reference acceleration vector V1 and the current acceleration vector V2. This may be done, for example, using the scalar product circuit 228 of FIG. 2 as discussed above (e.g., by applying equation 5). The method 300 proceeds from 312 to 314.

At 314, the method 300 generates an indication of $\cos(\alpha)$, which may be $\cos(\alpha)$ or $|\cos(\alpha)|$ or an estimation or approximation of $\cos(\alpha)$ or $|\cos(\alpha)|$, for example, when estimation or approximation techniques are employed. This may be done, for example, using division circuit 230 of FIG. 2 as discussed above (e.g., by applying equation 12 or 13). The method 300 proceeds from 314 to 316.

At 316, the method 300 compares the indication of $\cos(\alpha)$ to one or more thresholds or threshold ranges. This may be done, for example, using tilt signal generator circuit 232 of FIG. 2 as discussed above. The method 300 proceeds from 316 to 318.

At 318, the method 300 determines whether a tilt event has occurred based on the comparison at 316. This may be done, for example, using the using tilt signal generator circuit 232 of FIG. 2 as discussed above.

When it is determined at 318 that a tilt event has occurred, the method proceeds to 320, where a tilt signal TILT is generated. The method proceeds from 320 to 304, where the reference acceleration vector V1 is initialized to the current acceleration vector V2 (the vector which triggered the tilt event). As illustrated, the method 300 also proceeds to 322, where further processing in response to the detected tilt event may occur, such as processing of acceleration data by an application executing on an application processor, such as an exercise program execution of the processing core 102 of FIG. 1. The further processing may include, for example, determining a tilt angle, determining estimated gravities of the last tilt event and the current tilt event, classifying movements, providing context awareness, etc. When it is not determined at 318 that a tilt event has occurred, the method returns to 306, where the method receives or samples a next set of accelerometer data.

Embodiments of methods of detecting a tilt event may contain additional acts not shown in FIG. 3, may not contain all of the acts shown in FIG. 3, may perform acts shown in FIG. 3 in various orders, and may be modified in various respects. For example, when a tilt event is detected the method 300 may generate control signals to cause a stored value of the magnitude of the reference acceleration vector to be reset to the magnitude of the acceleration vector which triggered the tilt event. In another example, act 310 and act 312 may be performed concurrently, or act 312 may be performed prior to act 310, etc. In another example, the method 300 may determine whether the method 300 is done, for example, in response to a command from the processor core to stop detection of tilt events.

Figure 4:
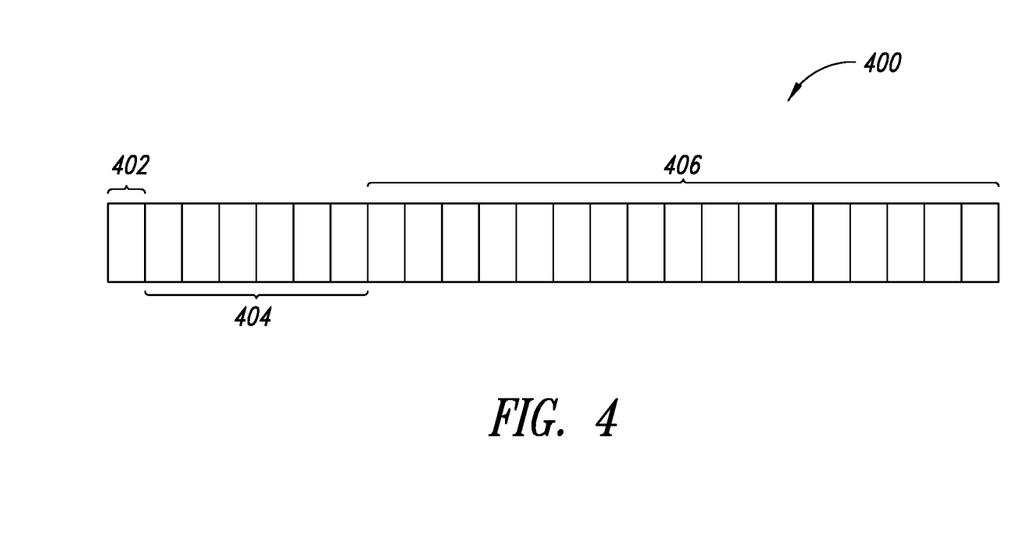
FIG. 4 illustrates an embodiment of a 24 bit mid-precision floating point representation of a value.

FIG. 4 illustrates an embodiment of a 24 bit mid-precision floating point representation 400 of a value, which may be employed, for example, by an embodiment of a floating point unit, such as the floating point unit 274 or the floating point unit 290 of FIG. 2. The sign S of the value is represented by a bit 402, the exponent E is represented by 6 bits 404, and the mantissa M is represented by 17 bits 406. When the bias point is 31, for E>0, $$x=(-1)^S \cdot (1+M \cdot 2^{-17}) \cdot 2^{(-B)} \quad (14)$$

and for E=0, $$x=(-1)^S \cdot (M \cdot 2^{-17})$$

The approximate range is:

$$X \in (-4.295 \cdot 10^{-9}; 4.295 \cdot 10^9) \quad (15)$$

The minimum non-zero number is $2^{-47}$, and integer conversion is correct in the interval $[0, 2^{18}]$. Table 1 illustrates mid precision floating point examples.

TABLE 1

| Representation | Value |
|---|---|
| 0 - 000000 - 00000000000000000 | zero+ |
| 1 - 000000 - 00000000000000000 | zero− |
| 0 - 011111 - 00000000000000000 | 1 |
| 1 - 100000 - 00000000000000000 | −2 |
| 0 - 000000 - 00000000000000001 | $2^{-47}$ = 7.1 − 54e−15 minimum positive subnormal |
| 0 - 000000 - 11111111111111111 | $2^{-30}$-$2^{-47}$ = 9.3132e−10 maximum subnormal |
| 0 - 000001 - 00000000000000000 | $2^{-30}$ minimum positive normal |
| 0 - 111110 - 11111111111111111 | 4.295e9 maximum subnormal |

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various embodiments and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an accelerometer, which, in operation, generates accelerometer data; and
digital signal processing circuitry communicatively coupled to the accelerometer, wherein the digital signal processing circuitry, in operation:
generates, based on the generated accelerometer data, a value indicative of a cosine of an angle between an acceleration vector associated with current accelerometer data and a reference acceleration vector, wherein the generating the value indicative of the cosine of the angle between the acceleration vector associated with current accelerometer data and the reference acceleration vector includes:
generating a value indicative of a scalar product of the vector associated with current accelerometer data and the reference acceleration vector; and
dividing the value indicative of the scalar product by a value indicative of a magnitude of the vector associated with current accelerometer data multiplied by a value indicative of a magnitude of the reference acceleration vector;
compares the generated value indicative of the cosine of the angle between the acceleration vector associated with current accelerometer data and the reference acceleration vector with one or more thresholds; and
generates a signal indicative of a tilt based on the comparison of the generated value indicative of the cosine of the angle between the acceleration vector associated with current accelerometer data and the reference acceleration vector with the one or more thresholds, wherein, in response to the signal indicative of a tilt indicating detection of a tilt event, the device processes accelerometer data associated with the tilt event using an exercise program.

2. The device of claim 1, wherein the accelerometer is a three-axis accelerometer which, in operation, outputs an acceleration signal of each axis.

3. The device of claim 2 wherein the digital signal processing circuitry includes a vector magnitude detector circuit, which, in operation, determines magnitudes of vectors associated with current accelerometer data.

4. The device of claim 3 wherein the digital signal processing circuitry includes a scalar product circuit, which, in operation, generates the value indicative of the scalar product of the vector associated with current accelerometer data and the reference acceleration vector.

5. The device of claim 4 wherein the digital signal processing circuitry comprises a division circuit, which, in operation, divides a numerator by a denominator, generating the value indicative of the cosine of the angle between the acceleration vector associated with current accelerometer data and the reference acceleration vector, wherein,
the numerator is the value indicative of the scalar product, and
the denominator is the value indicative of the magnitude of the vector associated with current accelerometer data multiplied by the value indicative of the magnitude of the reference acceleration vector.

6. The device of claim 5 wherein the division circuit, in operation, generates an inverse of the denominator.

7. The device of claim 2 wherein the digital signal processing circuitry comprises a low pass filter, which in operation, generates, for each axis, a filtered acceleration signal.

8. The device of claim 7 wherein the filtered acceleration signals are moving averages of the acceleration signal of the respective axis over a finite sliding window.

9. The device of claim 2 wherein the accelerometer comprises an analog-to-digital converter.

10. The device of claim 1 wherein the reference acceleration vector is a vector associated with previous accelerometer data.

11. The device of claim 1 wherein the digital signal processing circuitry, in operation,
compares the generated value indicative of the cosine of the angle between the acceleration vector associated with current accelerometer data and the reference acceleration vector to a threshold value; and
in response to the comparison indicating the generated value indicative of the cosine of the angle between the acceleration vector associated with current accelerometer data and the reference acceleration vector exceeds the threshold value, sets the signal indicative of a tilt to indicate detection of a tilt.

12. The device of claim 1 wherein the signal indicative of a tilt is an interrupt signal.

13. The device of claim 1 wherein the digital signal processing circuitry comprises one or more of:
one or more coordinate rotation digital computer (CORDIC) circuits;
one or more floating point circuits;
one or more fixed point circuits;
one or more adders;
one or more multipliers;
one or more look-up-tables; and
one or more comparators.

14. The device of claim 1, wherein the processing accelerometer data associated with the tilt event comprises classifying the tilt signal.

15. The device of claim 1, wherein the processing accelerometer data associated with the tilt event comprises generating context awareness information.

16. A system, comprising:
one or more processing cores, which in operation, process digital data; and
a sensor, communicatively coupled to the one or more processing cores, the sensor including:
an accelerometer, which, in operation, generates accelerometer data; and
digital signal processing circuitry communicatively coupled to the accelerometer, wherein the digital signal processing circuitry, in operation:
generates, based on the generated accelerometer data, a value indicative of a cosine of an angle between an acceleration vector associated with current accelerometer data and a reference acceleration vector, wherein the generating the value indicative of the cosine of the angle between the acceleration vector associated with current accelerometer data and the reference acceleration vector includes:
generating a value indicative of a scalar product of the vector associated with current accelerometer data and the reference acceleration vector; and
dividing the value indicative of the scalar product by a value indicative of a magnitude of the vector associated with current accelerometer data multiplied by a value indicative of a magnitude of the reference acceleration vector;
compares the generated value indicative of the cosine of the angle between the acceleration vector associated with current accelerometer data and the reference acceleration vector with one or more thresholds; and
generates a tilt signal based on the comparison of the generated value indicative of the cosine of the angle between the acceleration vector associated with current accelerometer data and the reference acceleration vector with the one or more thresholds, wherein, in response to the signal indicative of a tilt indicating detection of a tilt event, an exercise program executing on the one or more processing cores processes accelerometer data associated with the tilt event.

17. The system of claim 16, wherein the accelerometer is a three-axis accelerometer which, in operation, outputs an acceleration signal of each axis.

18. The system of claim 17 wherein the digital signal processing circuitry includes a vector magnitude detector circuit, which, in operation, determines magnitudes of vectors associated with current accelerometer data.

19. The system of claim 18 wherein the digital signal processing circuitry includes a scalar product circuit, which, in operation, generates the value indicative of the scalar product of the vector associated with current accelerometer data and the reference acceleration vector.

20. The system of claim 19 wherein the digital signal processing circuitry comprises a division circuit, which, in operation, divides a numerator by a denominator, generating the value indicative of the cosine of the angle between the acceleration vector associated with current accelerometer data and the reference acceleration vector, wherein,
the numerator is the value indicative of the scalar product, and
the denominator is the value indicative of the magnitude of the vector associated with current accelerometer data multiplied by the value indicative of the magnitude of the reference acceleration vector.

21. The system of claim 17 wherein the digital signal processing circuitry comprises a low pass filter, which in operation, generates, for each axis, a filtered acceleration signal.

22. The system of claim 16 wherein the reference acceleration vector is a vector associated with previous accelerometer data.

23. The system of claim 16 wherein the tilt signal is an interrupt signal and the one or more processing cores, in operation, responds to the interrupt signal by analyzing accelerometer data generated by the accelerometer.

24. The system of claim 16, wherein the processing accelerometer data associated with the tilt event comprises classifying the tilt signal.

25. The system of claim 16, wherein the processing accelerometer data associated with the tilt event comprises classifying movements.

26. A method, comprising:
generating, using digital signal processing circuitry, a value indicative of a cosine of an angle between an acceleration vector associated with current accelerometer data and a reference acceleration vector, the generating the value indicative of the cosine of the angle between the acceleration vector associated with current accelerometer data and the reference acceleration vector including:

generating a value indicative of a scalar product of the vector associated with current accelerometer data and the reference acceleration vector; and dividing the value indicative of the scalar product by a value indicative of a magnitude of the vector associated with current accelerometer data multiplied by a value indicative of a magnitude of the reference acceleration vector;

comparing the generated value indicative of the cosine of the angle between the acceleration vector associated with current accelerometer data and the reference acceleration vector with one or more thresholds;

generating a tilt signal based on the comparison of the generated value indicative of the cosine of the angle between the vector associated with current accelerometer data and the reference acceleration vector with the one or more thresholds; and in response to the signal indicative of a tilt indicating detection of a tilt event, processing accelerometer data associated with the tilt event using an exercise program.

27. The method of claim 26, comprising generating accelerometer data using a three-axis accelerometer.

28. The method of claim 27, comprising: filtering the generated accelerometer data, generating the current accelerometer data.

29. The method of claim 26, comprising:
generating an application-processor interrupt signal based on the tilt signal.

30. The method of claim 26, wherein the processing accelerometer data associated with the tilt event comprises classifying the tilt signal.

31. The method of claim 26, wherein the processing accelerometer data associated with the tilt event comprises generating context awareness information.

* * * * *